United States Patent [19]

Cline et al.

[11] Patent Number: 4,989,522
[45] Date of Patent: Feb. 5, 1991

[54] METHOD AND SYSTEM FOR INCINERATION AND DETOXIFICATION OF SEMILIQUID WASTE

[75] Inventors: George H. Cline, Anchorage, Ak.; Dale C. Edward, San Juan Bautista, Calif.; Bob G. Langberg; Kurt G. Winkler, both of Anchorage, Ak.

[73] Assignee: Sharpe Environmental Services, Anchorage, Ak.

[21] Appl. No.: 393,490

[22] Filed: Aug. 11, 1989

[51] Int. Cl.⁵ .................................................. F23G 5/00
[52] U.S. Cl. .................................. 110/250; 110/346; 110/215; 110/259; 110/255; 110/238; 110/233
[58] Field of Search .............. 110/250, 235, 238, 229, 110/222, 165 R, 171, 215, 216, 346, 217, 236, 259

[56] References Cited

U.S. PATENT DOCUMENTS

| | | | |
|---|---|---|---|
| 4,437,419 | 3/1984 | Hertel | 110/259 |
| 4,667,609 | 5/1987 | Hardison et al. | 110/236 |
| 4,770,109 | 9/1988 | Schlienger | 110/250 |
| 4,788,918 | 12/1988 | Keller | 110/259 |
| 4,802,424 | 2/1989 | McGinnis, III et al. | 110/250 |
| 4,821,653 | 4/1989 | Jones | 110/238 |
| 4,829,911 | 5/1989 | Nielson | 110/259 |

Primary Examiner—Edward G. Favors
Assistant Examiner—Denise L. Ferensic
Attorney, Agent, or Firm—Christensen, O'Connor, Johnson & Kindness

[57] ABSTRACT

A method and system for detoxification of waste materials, comprising incineration of the waste materials followed by additional contaminant reduction steps. The waste material is separated into solid and liquid portions that are fed separately into a combustion chamber wherein they are exposed to a plasma arc torch to affect combustion, producing a gaseous emissions stream and an obsidian residue. The gaseous emissions stream passes through an emissions control unit to eliminate acid gases, metals, and particulates, producing a cleansed exhaust gas and an emissions residue. The emissions residue is passed through an electroplating unit to reclaim metals. The obsidian residue is pulverized and then treated by a chemical process, or passed through the electroplating unit, to reduce the concentration of unbound barium contained therein, producing an inert obsidian residue that is free of toxic levels of all contaminants.

19 Claims, 4 Drawing Sheets

METHOD AND SYSTEM FOR INCINERATION AND DETOXIFICATION OF SEMILIQUID WASTE

The present invention relates to a method for the incineration and further detoxification of waste, as well as a system for performing the same and, more particularly, to the incineration and detoxification of semiliquid waste and, even more particularly, to the incineration and detoxification of semiliquid waste produced by oil industry drilling operations.

BACKGROUND OF THE INVENTION

Waste by-products produced by many industrial processes, and to a lesser extent consumer generated wastes, are often contaminated with toxic organic contaminants and trace metal contaminants. If left untreated, these wastes must be stored in specialized storage containers and deposited in Environmental Protection Agency (EPA) approved landfills to prevent leaching of the contaminants into the ground water. Storage of toxic wastes presents a grave environmental hazard due to the potential for improper storage, or failure of the storage site to contain the toxic leachates. Approved toxic landfill sites are continually growing more scarce, and those remaining are faced with an overwhelming volume of industrially created waste. The costs of shipping toxic waste to the remaining landfills, and fees for interning the waste there, are prohibitive.

Incineration process techniques have been developed over the years in an attempt to treat these toxic wastes by burning off the organic contaminants therein to produce a reduced volume of somewhat less toxic solid waste. The solid waste by-product of such incineration may contain trace metals that failed to oxidize during incineration, and typically must still be handled and stored as a toxic waste. These conventional incineration methods also produced exhaust gas by-products that are toxic in themselves if left untreated, and are harmful to the atmosphere if released.

One example of an industrial waste that must be either decontaminated or stored as a toxic waste is the drilling muds produced by oil industry drilling operations. Drilling muds are gels that are introduced to well bores during drilling of a well to lubricate the drill bit and shaft, and may initially be comprised of water, barite clay, density increasing weighting agents, stabilizers, and an oil base, such as mineral oil. The weighting agents used in these drilling muds may be either mineral or organic materials. During drilling of a well, the drilling mud becomes contaminated with cuttings (bits of rock that have been augered from the earth) and crude oil. In addition, the drilling mud may contain traces of heavy metals that originate from the cuttings, from the weighting agents used in the drilling muds, or from the drilling system itself. The drilling mud is semiliquid in nature and is conventionally stored in reserve pits or boxes as it is produced. Due to the organic and metal contaminants contained therein, the drilling muds must be shipped, handled, and stored as an industrial waste.

The potential utilization of conventional incineration techniques to incinerate drilling mud waste is difficult on a large scale due to the high heat intensity required to melt the minerals contained in the mud and to completely combust the crude oil contaminants contained therein. In addition, the solid by-product that typically results from incineration of such material contains residual trace metal contaminants that still render the waste toxic.

SUMMARY OF THE INVENTION

The present invention was developed to provide for the incineration and further detoxification of toxic wastes to produce a cleansed exhaust gas that may be released to the atmosphere in compliance with all applicable environmental regulations, and an obsidian residue that has been stripped of all toxic contaminants to meet applicable environmental regulations, and that may be stored as an inert, nontoxic, material in an ordinary landfill.

The nontoxic obsidian residue represents a substantial reduction in both weight and volume as compared to the original drilling mud, reducing the cost of transportation of the processed waste, as well as reducing the volume occupied in the ordinary landfill. Further benefits of the present invention are the utilization of the energy produced by the hydrocarbon waste during incineration, the recycling of the heavy metals that are removed from the waste during detoxification, and the potential recycling of the obsidian waste as an inert filler for use in concrete or paving materials.

The method for incineration and detoxification of waste of the present invention involves the introduction of the waste into a system that incinerates that waste and then further treats the gaseous emissions and solid residue produced therefrom to remove remaining contaminants.

When the waste to be detoxified is semiliquid, a preliminary step in the method is utilized. The preliminary step involves the passage of the semiliquid waste through a centrifuge to separate it into a substantially liquid portion and a substantially solid portion. Centrifugation may be accomplished off site prior to shipment for incineration and detoxification. The solid portion is then shredded to produce chips that may be fed on a continuous basis into a combustion chamber. The liquid waste portion is fed into the combustion chamber through a separate inlet. The combustion chamber is refractory lined and includes a plasma arc torch to provide high intensity heat to melt and oxidize the solid waste. The combustion of the liquid and solid wastes produces a gaseous emissions stream and a molten residue stream.

The gaseous emissions stream then passes through a conventional gas treatment sequence that condenses the water vapor in the emissions stream and results in absorption of toxic contaminants and contaminants and collection of particulate matter into the condensed water droplets. The water drops containing the absorbed contaminants and collected particulates are then separated from the gas stream to produce a cleansed exhaust gas that may be released into the atmosphere and an emissions residue. The emissions residue is then further treated by an electroplating step to remove trace metals, resulting in an inert emissions by-product.

The molten residue, which is substantially free of organic contaminants, exits the combustion chamber and is poured onto a sand covered conveyor belt where it cools and solidifies into a glassy obsidian as it advances on the moving belt. The sand and cooled residue are then passed through a screening unit to separate the obsidian residue from the sand, with the sand being recycled back onto the belt.

The obsidian residue is substantially free of all toxic organic and metal contaminants with the exception of barium. To allow for further detoxification, the obsidian residue is fed into a pulverizing unit to be turned into an obsidian powder. The powdered obsidian residue is further treated by either of two steps to reduce the concentration of water-soluble, and thus leachable, barium to non-toxic levels. One barium reduction step involves passing the pulverized barium residue through an electroplating process, similar to that used to treat the emissions residue. A second, and preferred, barium reduction, or conversion, process involves the addition of hydrated calcium sulfate (gypsum) and water to produce a water insoluble barium sulfate (barite clay). The pulverized obsidian residue is then dried after the completion of the barium reduction step to produce as an end product an inert powdered obsidian residue that meets all environmental standards for nontoxic wastes.

BRIEF DESCRIPTION OF THE DRAWINGS

The above-mentioned and other advantages of the present invention will be readily understood by those of ordinary skill in the art upon reading the following specification in conjunction with the appended drawings, in which.

DETAILED DESCRIPTION OF THE PREFERRED EMBODIMENT

Figure 1:
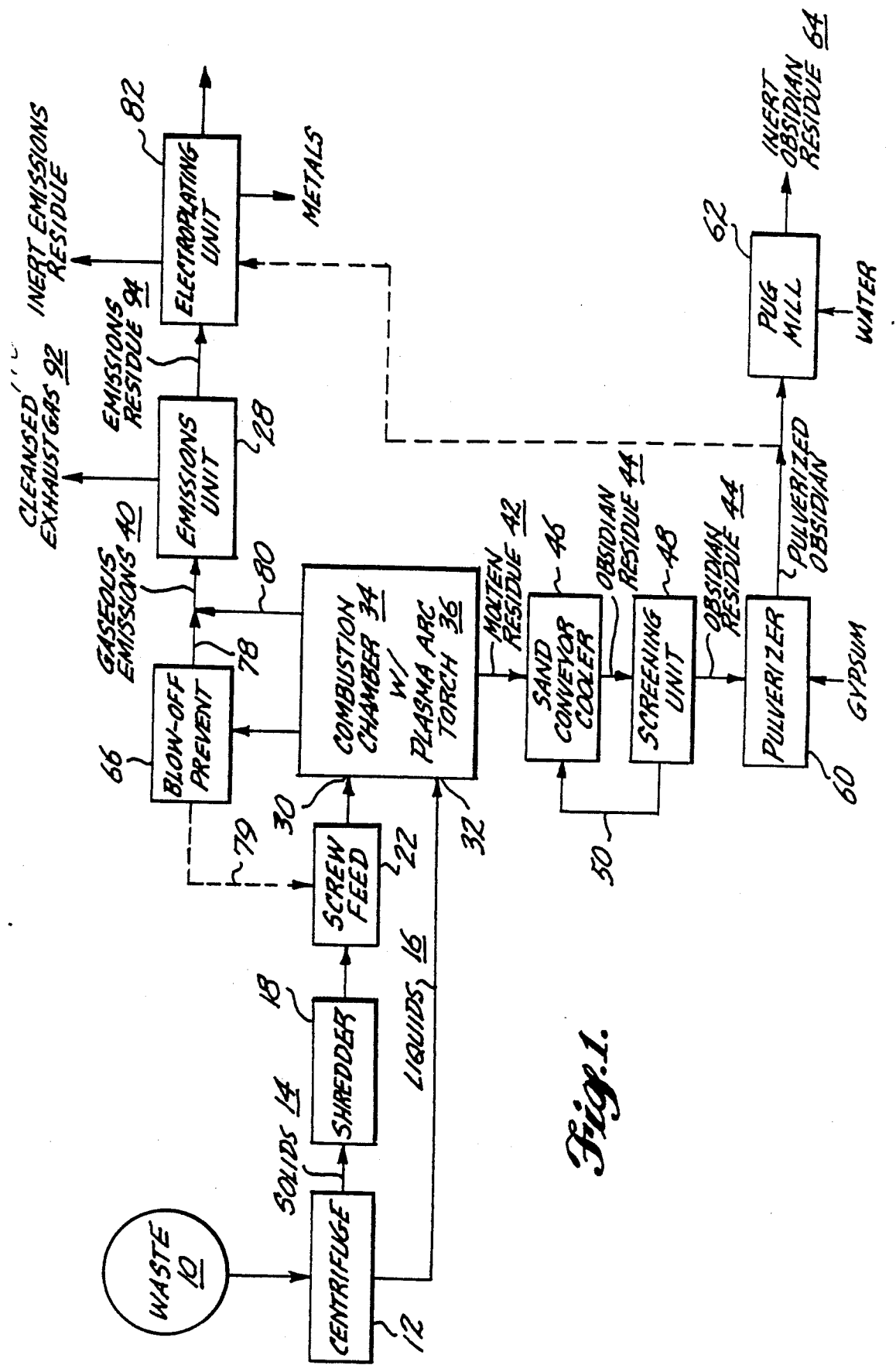
FIG. 1 is a flow chart diagram of the overall incineration and detoxification process.

The flow chart diagram of FIG. 1 illustrates a preferred embodiment of the present invention as utilized to incinerate and detoxify a semiliquid waste, such as drilling mud produced by oil industry operations. It should be understood that the method and system of the present invention are equally advantageously utilized for other wastes containing organic, inorganic, metal or other contaminants. Examples of other waste suitably treated by the present invention are oil spill cleanup waste and marine dredging waste. Process parameters are provided herein as an example of a preferred embodiment of the present invention as applied to oil industry drilling wastes, and would necessarily be adjusted to accommodate the differing composition of other waste materials. When the method of the present invention is utilized for substantially solid waste, the solid/liquid separation step described herein would not be necessary.

The gel type drilling muds utilized in oil industry drilling operations typically include water, barite (clay), weighting agents, stabilizers, and sometimes an oil base. The weighting agents are added to increase the density of the drilling mud, and may consist of organic materials such as walnut shells or sawdust, bentonite clays, or, less often, metals. The oil base that is sometimes present is typically mineral oil or diesel fuel. After utilization to drill an oil well, the drilling mud is contaminated by rock and earth cuttings, crude oil, and, potentially, metal shavings from the drilling system. The resultant drilling mud waste is potentially toxic due to the presence of trace heavy metals, which may originate from the weighting agents, the cuttings, or the metal shavings, and toxic organic contaminants that originate from the crude oil.

Referring to FIG. 1, semiliquid waste 10, for example, the used drilling mud described above, is fed into a conventional centrifuge 12 for separation into a substantially solid waste portion 14 and a substantially liquid waste portion 16. The solid waste portion 14, which may be contained in plastic or plywood boxes, is then fed to a conventional shredding unit 18 that utilizes a mechanism to shred the solid waste into chips that are preferably less than four inches thick in any dimension, although it is to be understood that other chip thicknesses may be utilized. The shredding step is necessitated by the tendency of drilling mud to compact itself together, and may not be required for other types of wastes that do not tend to conglomerate.

Figure 2:
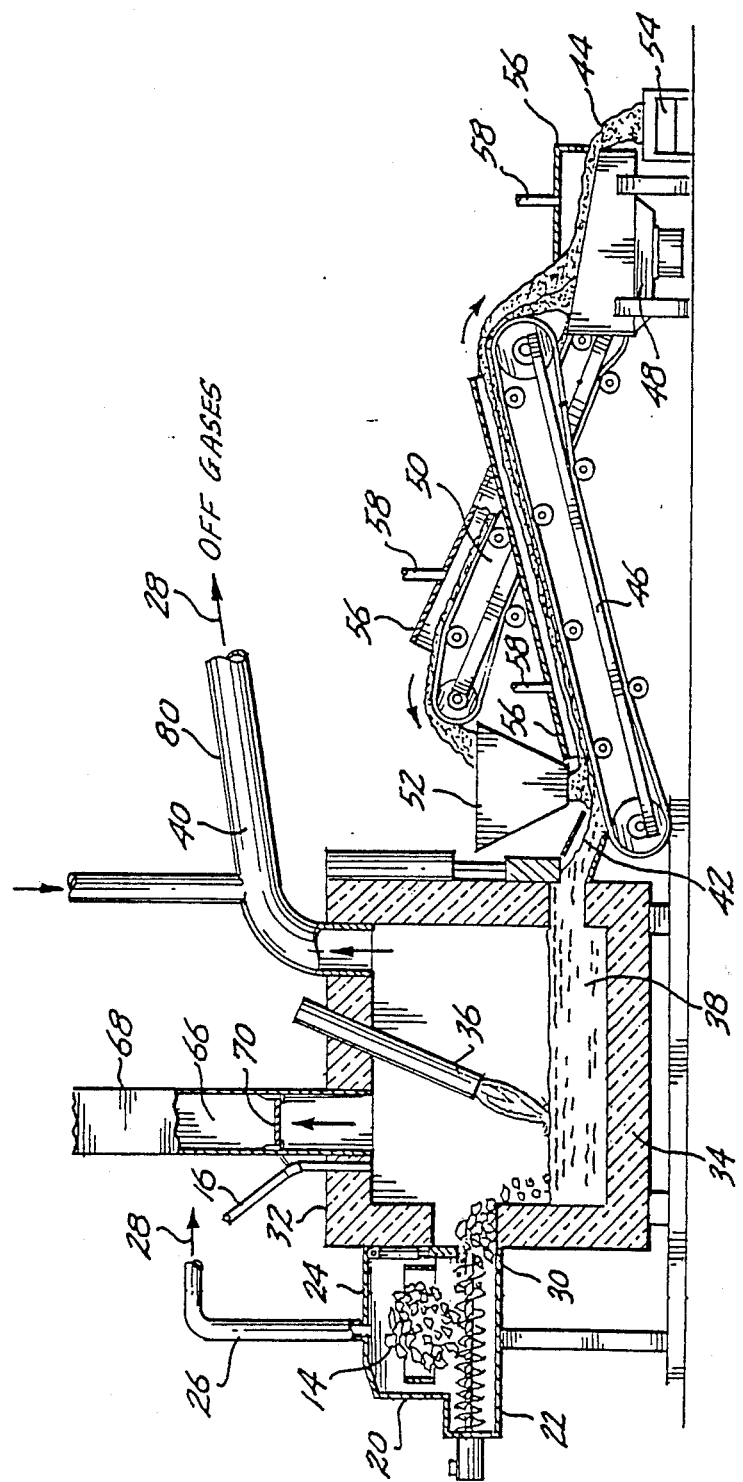
FIG. 2 is a somewhat schematic diagram of the feed system, combustion chamber, and cooling and conveyor systems.

The shredded solid waste 14 is then fed into a feed hopper 20 of a conventional screw feeder 22, as illustrated in the schematic diagram of FIG. 2. The feed hopper 20 is covered by an environmentally secure feeder cover 24 that is vented by a vent line 26 to a gaseous emissions control unit 28, which will be described below. The vent line 26 allows for any off-gases and particulates that are emitted by the shredded solids 14 to be vented for later treatment, rather than being emitted into the atmosphere.

While the feeder 22 is illustrated as a conventional screw feeder, other conventional types of solid feeders alternately may be used, such as a pug mill feeder, ram-type feeder, or progressive cavity pump. Referring to the flow chart diagram of FIG. 1, as well as the schematic diagram of FIG. 2, the solid waste portion 14 and liquid waste portion 16 are continuously introduced through inlet ports 30 and 32, respectively, into a refractory brick lined combustion chamber 34, where they are heated by plasma produced by a plasma arc torch 36.

Plasma arc torches have been developed over the years for use in other process applications, and operate by passing an alternating or direct current through a gas flowing between two electrodes to produce a high-temperature plasma that is comprised of partially ionized gas molecules. One configuration of torch, referred to as a transferred arc torch, is sometimes used to melt materials, with the molten material serving as one electrode (the cathode) that operates in conjunction with another electrode (the anode) contained within the torch to produce an arc. The plasma arc torch 36 utilized in the present invention is preferably of the direct current transferred arc type, although other torch types can be alternatively utilized. The plasma arc torch provides a high-intensity heat source that is capable of incinerating the solid waste portion 14 and liquid waste portion 16 at a high throughput rate. In the preferred embodiment a 500 kw or larger plasma arc torch may be utilized to allow for a process flow rate of approximately 2500 pounds of solid and liquid waste combined per hour. Suitable torches of this size and type are available from Plasma Energy Corporation, Retech, Inc., and E. S. Fox, Inc. Larger or smaller wattage plasma arc torches may be used to provide for different flow rates of waste material. It is also evident that other types of high intensity heat sources that are capable of maintaining the necessary temperatures and flow rates could be utilized, but it has been found that plasma arc torches are particularly well suited for application in the present invention.

The plasma arc torch 36 may be operated to produce a plasma temperature of about 7200° F. to 12600° F. The temperature setting of the torch and the waste flow rate are adjusted to ensure that the solid waste portion 14 is heated to a temperature of at least 3000° F. as it is introduced into the combustion chamber to begin melting the solid waste 14. The plasma arc torch 36 maintains a pool of molten waste 38 in the base of the combustion chamber 34 at a temperature of 3000° F. or higher to complete the melting of the solid waste and to allow for complete combustion of the organic constituents of the waste 10.

The incineration of the waste 10 results in a gaseous emissions stream 40 and a molten residue 42, each of which is treated futher to remove residual contaminants. The molten residue 42 produced by the incineration of oil drilling muds is substantially free of all toxic contaminants except for a toxic residual amount of barium. The molten residue 42 is deposited on a sand-covered cooling belt conveyor 46. While traveling on the conveyor 46 the residue cools to a temperature of approximately 1800° F., at which point it solidifies into a glassy obsidian residue 44. The sand located on the upper surface of the conveyor 46 serves to prevent the molten residue 42 from adhering to the conveyor surface, as well as acting as a heat sink to absorb heat from the molten residue. The speed of the cooling conveyor 46 is adjusted to allow for sufficient cooling of the molten residue 42 by the time it reaches the end of the conveyor belt, at which point it is discharged into a conventional vibratory screening unit 48 or other type of sieving device. The screening unit is sized to permit the sand to fall through and be collected on a return sand conveyor 50 for recycling. The return sand conveyor 50 discharges the sand into a sand hopper 52 from which it is reintroduced onto the leading end of the cooling conveyor 46 to receive additional molten residue 42.

The solidified obsidian residue 44 passes over the screening unit 48, and is broken into pieces by the vibratory action of the screening unit 48. Other types of conventional screening devices may alternately be used. As the screening unit 48 fills to overflowing with the cooled obsidian residue 44, it is discharged onto an obsidian conveyor 54. The cooling conveyor 46, vibratory screening unit 48, and return sand conveyor 50 are all enclosed by environmentally secure covers 56, each of which is vented by vent lines 58 to the emissions control unit 28, to prevent inadvertent discharge of toxic off-gases into the atmosphere. Although the cooling conveyor 46 and vibratory screener 48 have been provided as one example of a method step to solidify the molten residue 42, other methods may be used. One further example would be the exposure of the molten residue to a cold quenching gas or liquid to cool and solidify the residue, or the use of an auger in place of the conveyor.

The obsidian residue 44 is free of toxic contaminants in accordance with all applicable Environmental Protection Agency toxicity standards or rules with the exception of barium. The residual barium originates from the barite clay (barium sulfate, BaSO4) that is contained in the original drilling mud. During the incineration process, some of this barite, which is insoluble in water, is transformed into soluble anhydrous barium hydrate (Ba(OH)2). The concentration of soluble barium in the obsidian residue must be reduced for the residue to be classified as an inert material for landfill purposes. In accordance with the principles of the present invention, the obsidian is processed by either of two methods to effect the reduction of soluble barium.

The first and preferred step for barium reduction is the addition of gypsum, or hydrated calcium sulfate (CaSO4), and water to the obsidian to cause a chemical reaction that returns the unbound barium to the barite form. The obsidian residue 44 is first fed into a conventional pulverizer unit 60. A somewhat greater than stoichiometric quantity of gypsum is added to the pulverizer unit with the obsidian residue, and both are ground to a fine powder. The pulverized obsidian and gypsum mixture then passes into a pug mill 62 where water is introduced as required to drive the desired reaction to completion, as determined by a chemical analysis of the pulverized obsidian residue. Alternately, ground gypsum may be added directly to the pug mill instead of the pulverizer. The pug mill 62 mixes and intimately contacts the pulverized obsidian, gypsum, and water to produce the following chemical reaction:

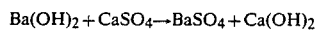

$$Ba(OH)_2 + CaSO_4 \rightarrow BaSO_4 + Ca(OH)_2$$

The pug mill thus produces an inert obsidian residue 64 that is free of all toxic levels of contaminants, including soluble barium, and which may be prepared for shipment to a conventional landfill or used in other manufacturing processes, such as for filler in concrete and paving materials.

An alternative method step for removal of the soluble barium from the obsidian residue involves the use of a conventional electroplating process to plate the barium onto a charged anode. When utilizing this alternative process step, the obsidian residue 44 is fed into the pulverizer unit 60 after leaving the screening unit 48, however, no gypsum is added to the obsidian. The pulverized obsidian 44 is then passed through an electroplating unit 82 as shown in block diagram form in FIG. 1. The alternate electroplating process involves the introduction of the pulverized obsidian into an electroplating bath containing an electroplating solution that includes 10 to 20 percent by volume of sulfuric acid in water. Alternately, other mineral acids or electrolytes may be used. The electroplating unit utilizes a lead cathode and an anode which may be formed from stainless steel, copper or other suitable metals. Current passing through the bath causes barium ions that leach from the pulverized obsidian to plate onto the cathode. After completion of the electroplating process, the recovered barium may be stripped from the cathode for recycling.

The level of barium in the pulverized obsidian is reduced to a nontoxic level through this electroplating process, and the resulting treated obsidian residue can then be removed from the bath by filtering or other conventional separation technique, rinsed to remove the acidic electroplating solution, and dried. The treated pulverized obsidian residue may then be landfilled or used as a raw material in manufacturing processes, as discussed previously. The electroplating process described above is provided as one example of a conventional electroplating bath that may be employed to remove the barium from the obsidian residue. Other combinations of plating solutions, anodes, and cathodes may alternatively be used to achieve this result.

Referring to the detailed flow chart diagram of FIG. 1 and the schematic diagram of FIG. 2, the detoxification method includes steps for the further treatment of the gaseous emissions stream 40 that is produced by the combustion of the waste 10 in the combustion chamber 34. Note that if an unusually high percentage of crude oil is contained in the liquid waste portion 16, it may flash, or explosively combust, upon exposure to the heat produced by the plasma arc torch 36. To contain the rapid production of gaseous emissions produced by such a flash, the combustion chamber 34 includes a blow off preventor, or flash arrestor, stack 66. The blow off preventor stack 66 is shown in greater detail in the cross sectional view of FIG. 3, and provides an expansible volume to receive the resulting increase in gaseous emissions that occurs upon a flash, preventing the introduction of any off-gases into the atmosphere before complete detoxification.

The blow off preventor 66 is constructed from a cylindrical flue pipe 68 that rises upwardly from, and in fluid communication with, the combustion chamber 34. The blow off preventor 66 includes two generally circular stop plates 70 that are vertically spaced apart and mounted transversely across the interior of the flue pipe 68. Each stop plate 70 is suspended by a plurality of chains or cables 72 that have a first end secured to the interior of the flue pipe 68 and a second end secured to the stop plate 70. Each stop plate 70 is further supported around its edges by a plurality of flanges 74 that project inwardly from the interior surface of the flue pipe 68. When resting upon the flanges 74, the stop plates 70 act to substantially seal the flue pipe 68, creating a first volumetric reservoir 75 between the lowermost and uppermost plates 70, and a second volumetric reservoir 76 between the uppermost plate 70 and an end cap 77. The end cap 77 is spaced vertically away from and above the uppermost plate 70 and is secured to the top of the flue pipe 68 to seal it from the atmosphere.

The stop plates 70 are constructed of a temperature-resistant metal, such as a refractory alloy, and are thick enough to have sufficient weight to prevent the normal internal gas pressure of the combustion chamber from raising the stop plates 70 upwardly off of the flanges 74. When an explosive flash occurs, the internal gas pressure in the combustion chamber increases sufficiently to raise the lowermost stop plate 70 off of the flanges 74, restrained in its upward movement by the chains 72, and tipping the lowermost plate 70 to allow the off-gases to flow into the first volumetric reservoir 75 to increase the overall volume of the combustion chamber 34 and decrease the internal gas pressure. If sufficient gases are emitted by the explosive flash, the uppermost stop plate 70 is also lifted to further increase the internal volume of combustion chamber 34 by allowing off-gases to flow into the second volumetric reservoir 76.

Figure 3:
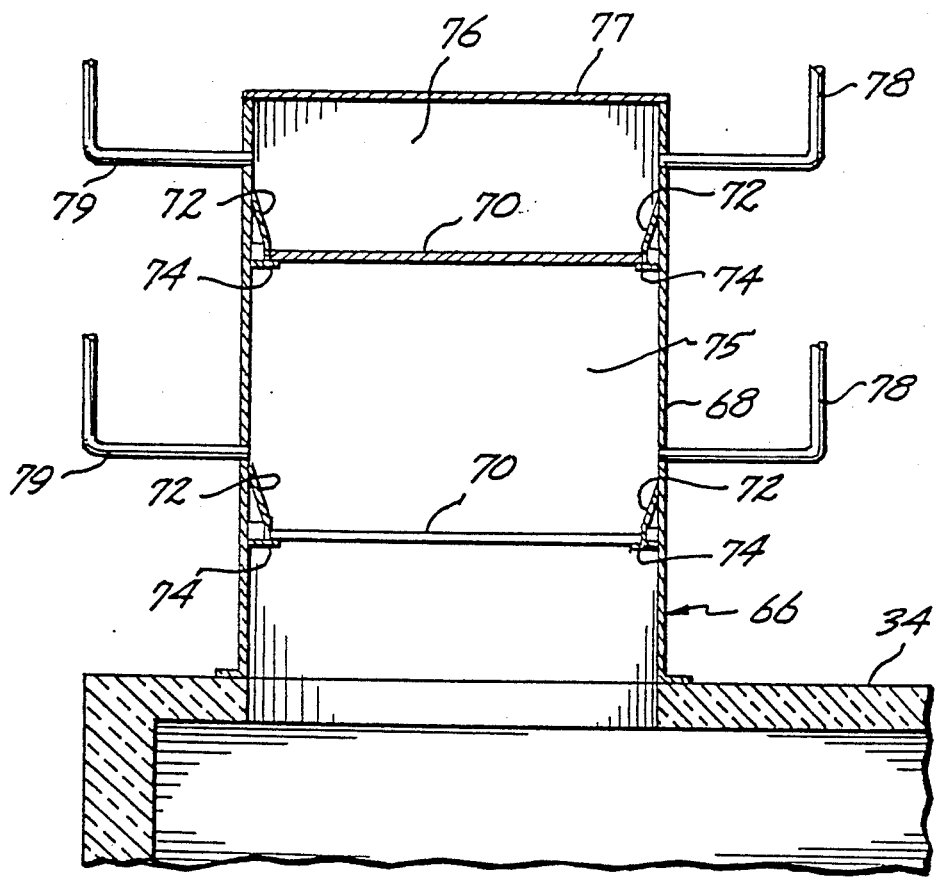
FIG. 3 is a cross-sectional side elevation view of the combustion chamber blow-off preventor.

Although the preferred embodiment is illustrated in FIG. 3 with a total of two stop plates 70, one stop plate 70 or more than two stop plates 70 could alternately be used depending on the flow rate of waste 14 into the combustion chamber 34, and corresponding volume of flash off-gases, which must be accommodated. Note also that the flue pipe and stop plates could be configured to have a square cross section, or other geometric configurations, instead of a circular cross section.

The first and second volumetric reservoirs 75 and 76 within the flue pipe 68 are vented by a plurality of vent lines 78 to the emissions control unit 28 for elimination of the off-gases that collect within flue pipe 68 after an explosive flash. When the explosive flash is completed, the stop plates 70 return to rest on the flanges 74 and the accumulated off-gases flow through the vent lines 78 into the emissions control unit 28. In addition, a backflow vent line 79 places the blow off preventor 66 in fluid communication with the feed hopper 20 to accommodate the dissipation of off-gases that may be forced by an explosive flash into the screw feeder 22.

Combustion of the waste 10 in the combustion chamber 34 results in the elimination of many toxic contaminants contained therein, but also produces toxic by-products that are disbursed in the gaseous emissions stream 40 and that must be eliminated to meet Environmental Protection Agency standards before that gaseous stream can be released into the atmosphere. The gaseous emissions stream may be contaminated by some or all of the following toxic constituents: acid gases, such as (hydrogen chloride) and/or (sulfur oxides), (nitrogen oxides), trace metals or their complexes, solid particulates, and products of incomplete combustion. Various conventional techniques exist for the treatment of incineration gas streams to remove these contaminants from the stream, and may employ a combination of electrostatic precipitators, gas scrubbers, condensers, absorbers, baghouses, spray dryers, or other types of gas treatment devices.

Figure 4:
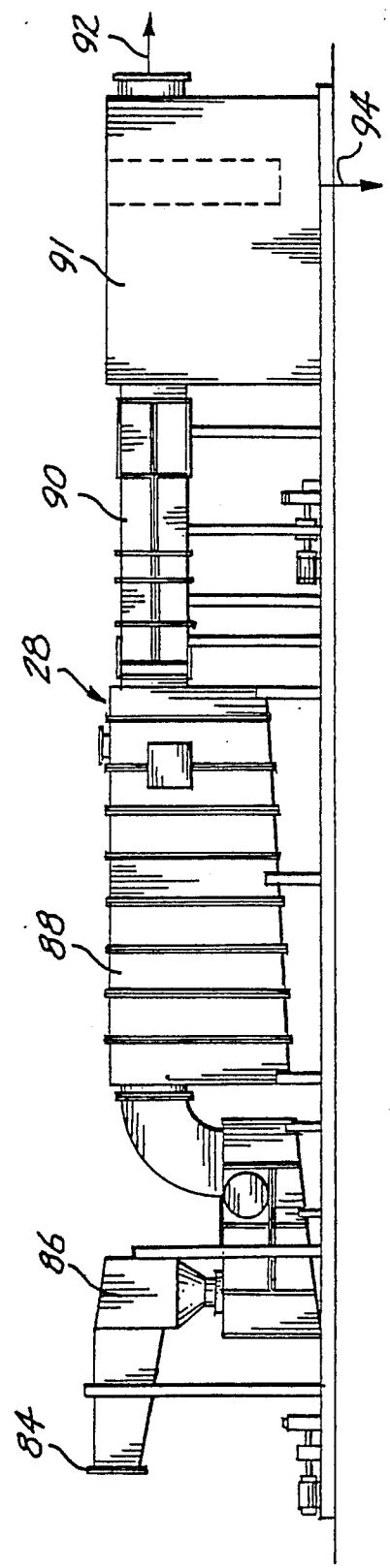
FIG. 4 is a side elevation view of the gaseous emissions system.

One example of a suitable conventional gas treatment system, embodied as the emissions control unit 28 in the preferred embodiment of the invention, is produced by Calvert, Incorporated. A schematic diagram of the Calvert manufactured emissions control unit 28 is illustrated in FIG. 4.

The gaseous emissions stream 40 produced by the combustion of the waste 10 exit the combustion chamber through a main emissions line 80 (FIG. 1). Before entering the emissions control unit 28, gases carried by vent lines 26, 58, and 78 are added to the main emissions line 80, and may carry with them additional organic contaminants or particulates. The main emissions line 80 is fluidly connected by an inlet port 84 to the emissions control unit 28 (FIG. 4). Inside the emissions control unit 28 the gaseous emissions stream first passes through a quencher 86 to cool and saturate the gas. The gaseous emissions stream next passes through a condenser/absorber 88, which results in further cooling of the gas, inducing the growth of particulates, the condensation of water vapor, the absorption of some acid gases into the condensed water droplets, and the collection of some particulates by the condensed water droplets. As the gaseous emissions are cooled the metal contaminants condense onto the particulates. The gas stream then passes through a conventional scrubber 90, to affect the absorption of remaining acid gases and collection of the remaining particulates by atomized water droplets. A suitable scrubber is one manufactured by Calvert Incorporated and sold under the trademark CALVERT Collision Scrubber.

Finally, the emissions stream passes through an entrainment separator 91 to remove the water droplets, containing the absorbed contaminants and collected particulates, from the gas stream, producing a cleansed exhaust gas stream 92 that may be released to the atmosphere and an emissions residue 94 that is then passed through an additional method step, as shall be described, to remove the entrained contaminants.

The emissions stream may also alternately be passed through a quencher 86 that includes a conventional spray dryer upon introduction to the emissions control unit 28 to condense and remove nonvolatile particulates and metal salts from the stream, leaving water and volatile contaminant components to pass through the emissions control unit for additional detoxification.

In the preferred embodiment, the emissions residue 94 produced by the emissions control unit 28 passes directly into the electroplating unit 82, described above as used in treating the pulverized obsidian to remove toxic trace metals. The electroplating unit 82 is preferably set up using the same electroplating bath, cathodes, and anodes as previously described. The toxic trace metals contained in the emissions residue are progressively plated onto the cathode by raising the voltage supplied to the electroplating unit over a range sufficient to remove all types of metals present. These metals can then be recovered from the cathode for potential recycling, while the remaining emissions residue, which is now inert and free of toxic levels of contaminants, may be combined with the inert obsidian residue for disposal.

EXAMPLES

The present invention has been described above as utilized to treat semiliquid wastes that are generated by oil industry drilling operations. It is to be understood that the present invention may also be utilized to incinerate and detoxify other types of waste generated by other industries or consumers. The following examples provide analyses of toxic contaminant concentrations found in a typical sample of oil drilling waste before and after treatment by the method and system of the present invention, and are included to assist one of ordinary skill in making and using the invention. They are intended as representative examples of the present invention only, and are not intended in any way to limit the scope of this disclosure or the scope of protection granted by Letters Patent hereon. The contaminant concentrations provided in the following examples are given in either milligrams per liter (mg/l), parts per billion (ppb) or parts per million (ppm), as indicated. All concentrations were arrived at using standard industry protocol test methods, as indicated by footnotes, including EPA test methods where applicable.

EXAMPLE I

Contaminated oil waste drilling muds were tested for the organic and metalic contaminants listed in the following Table I to establish the initial concentration of contaminants therein. The waste was incinerated using a 500 kw plasma arc torch that was adjusted to melt the waste at 2200° F. and maintain a molten waste pool at 3000° F. in the combustion chamber. Table I contains the concentration of contaminants present in the obsidian residue produced by the combustion chamber, both before and after pulverization. The concentrations of contaminants listed for the obsidian residue before and after pulverization were obtained by soaking the residue in water for seven days and by analyzing the resulting leachate for contaminants that leached into the water. All contaminant concentrations in the obsidian and pulverized obsidian were below EPA Toxicity Guidelines with the exception of barium.

TABLE I

| Contaminant | Original Oil Drilling Mud Waste | Obsidian* Residue | Pulverized* Obsidian Residue | EPA Allowable Limits | Units |
|---|---|---|---|---|---|
| Benzene | ND(5)$^1$ | ND(1)$^3$ | ND(1)$^3$ | — | ppb |
| Toluene | 73$^1$ | ND(1)$^3$ | ND(1)$^3$ | — | ppb |
| Ethyl-benzene | ND(5)$^1$ | ND(1)$^3$ | ND(1)$^3$ | — | ppb |
| Chloro-benzene | ND(5)$^1$ | ND(1)$^3$ | ND(1)$^3$ | — | ppb |
| p & m Xylenes | 2.520$^1$ | ND(1)$^3$ | ND(1)$^3$ | — | ppb |
| o-Xylene | 3,420$^1$ | ND(1)$^3$ | ND(1)$^3$ | — | ppb |
| 1,4 Dichloro-benzene | ND(5)$^1$ | ND(1)$^3$ | ND(1)$^3$ | — | ppb |
| 1,3 Dichloro-benzene | ND(5)$^1$ | ND(1)$^3$ | ND(1)$^3$ | — | ppb |
| 1,2 Dichloro-benzene | ND(5)$^1$ | ND(1)$^3$ | ND(1)$^3$ | — | ppb |
| Naphthalene | 52.0$^2$ | ND(0.005)$^2$ | ND(0.005)$^2$ | — | mg/l |
| Acena-phythene | 19.2$^2$ | ND(0.005)$^2$ | ND(0.005)$^2$ | — | mg/l |
| Acena-phthylene | 5.1$^2$ | ND(0.005)$^2$ | ND(0.005)$^2$ | — | mg/l |
| Fluorene | 4.68$^2$ | ND(1.005)$^2$ | ND(0.005)$^2$ | — | mg/l |
| Phenanthrene | 1.56$^2$ | ND(1.005)$^2$ | ND(1.005)$^2$ | — | mg/l |
| Anthracene | 0.33$^2$ | ND(0.005)$^2$ | ND(0.005)$^2$ | — | mg/l |
| Fluoro-anthene | 0.35$^2$ | ND(0.005)$^2$ | ND(0.005)$^2$ | — | mg/l |
| Pyrene | ND(0.2)$^2$ | ND(0.005)$^2$ | ND(0.005)$^2$ | — | mg/l |
| Benzo(A)-Anthracene | ND(0.1)$^2$ | ND(0.005)$^2$ | ND(0.005)$^2$ | — | mg/l |
| Chrysene | ND(0.1)$^2$ | ND(0.005)$^2$ | ND(0.005)$^2$ | — | mg/l |
| Benzo (B&K)-Fluoro-anthene | ND(0.1)$^2$ | ND(0.005)$^2$ | ND(0.005)$^2$ | — | mg/l |
| Benzo (A) Pyrene | ND(0.2)$^2$ | ND(0.005)$^2$ | ND(0.005)$^2$ | — | mg/l |
| Indeno (1,2,3-CD) Pyrene | ND(0.5)$^2$ | ND(0.005)$^2$ | ND(0.005)$^2$ | — | mg/l |
| Dibenz (A,H)-Anthracene | ND(0.5)$^2$ | ND(0.005)$^2$ | ND(0.005)$^2$ | — | mg/l |
| Benzo (GHI-Perylene | ND(0.5)$^2$ | ND(0.005)$^2$ | ND(0.005)$^2$ | — | mg/l |
| Arsenic | 3.0$^4$ (Total) 0.0064$^6$ (E.P.Tox.) | ND(0.001)$^7$ | N(0.001)$^7$ | 0.05$^7$ 5.0$^6$ | mg/l mg/l |
| Barium | 4300$^5$ (Total) | 261$^8$ | 111$^8$ | 1.0$^8$ | mg/l |

TABLE I-continued

| Contaminant | Original Oil Drilling Mud Waste | Obsidian* Residue | Pulverized* Obsidian Residue | EPA Allowable Limits | Units |
|---|---|---|---|---|---|
| Cadmium | 1.3[6] (E.P.Tox.) 1.4[5] (Total) ND(0.01)[6] (E.P.Tox.) | ND(0.01)[9] | ND(0.01)[9] | 100.0[6] 0.010[9] | mg/l mg/l |
| Chromium | 22[5] (Total) 0.10[6] (E.P.Tox.) | ND(0.05)[10] | ND(0.05)[10] | 1.0[6] 0.05[10] 5.0[6] | mg/l mg/l mg/l |
| Lead | ND(5.0)[5] (Total) ND(0.05)[6] (E.P.Tox.) | ND(0.05)[12] | ND(0.05)[12] | 0.05[12] 5.0[6] | mg/l |
| Mercury | ND(0.1)[4] (Total) ND(0.0002)[6] (E.P.Tox.) | ND(0.0002)[13] | ND(0.0002)[13] | 0002[13] | mg/l |
| Selenium | ND(0.10)[4] (Total) ND(0.001)[6] (E.P.Tox.) | ND(0.001)[15] | ND(0.001)[15] | 0.2[6] 0.010[15] | mg/l mg/l |
| Silver | ND(5.0)[5] (Total) (E.P.Tox.) | ND(0.05)[16] | ND(0.05)[16] | 1.0[6] 0.05[16] 5.0[6] | mg/l mg/l mg/l |
| Chloride | 11,000 | ND(10) | ND(10) | — | mg/l |
| Fluoride | 6.3 | —[11] | —[11] | 2.4[11] | mg/l |
| Nitrate-N | 1.4 | ND(0.1)[14] | ND(0.1)[14] | — | mg/l |
| Sulfate | 160 | 6.5 | 6.0 | — | mg/l |

Notes:
*Analysis Performed on Seven Day Water Leachate for all contaminants in this sample.
ND(X) = Not Detectable above minimum concentration resolution X.
Test Method/Standard:
[1] EPA 8020.
[2] EPA 610.
[3] EPA 602.
[4] Atomic Absorption (total content of element in sample).
[5] Inductively Coupled Plasma (total content of element in sample).
[6] EP SW846 (E.P.A. Toxicity, 24-hour Glacial Acetic Acid (5.0 ± 0.2 pH) Leachate).
[7] ASTM D 2972.
[8] EPA 208.2.
[9] EPA 213.2.
[10] EPA 218.2.
[11] SM14 414C.
[12] EPA 239.2.
[13] SMH 301AVI.
[14] EPA 353.2.
[15] ASTM D 3895.
[16] EPA 272.2

Notes:
*Analysis Performed on Seven Day Water Leachate for all contaminants in this sample.

ND(X)=Not Detectable above minimum concentration resolution X. Test Method/Standard: [1] EPA 8020, [2] EPA 610, [3] EPA 602, [4] Atomic Absorption (total content of element in sample), [5] Inductively Coupled Plasma (total content of element in sample), [6] EP SW846 (E.P.A. Toxicity, 24-hour Glacial Acetic Acid (5.0±0.2 pH) Leachate), [7] ASTM D 2972, [8] EPA 208.2, [9] EPA 213.2, [10] EPA 218.2, [11] SM14 414C, [12] EPA 239.2, [13] SMH 301AVI, [14] EPA 353.2, [15] ASTM D 3895, [16] EPA 272.2

EXAMPLE II

A sample of the pulverized obsidian obtained from and analyzed in Example I, which contained 111 mg/l of barium (total, Table I), was passed through the electroplating process previously described to reduce the barium concentration. Four pounds of the pulverized obsidian were added to an electroplating bath containing one quart of acid in ten gallons of water, and a voltage of 3.5 volts was applied for a period of one hour and six minutes. The treated pulverized barium was removed from the bath, rinsed, and subjected to an EPA toxicity test per EPSW 846. That test involves elution with Glacial Acetic Acid, having a pH of 5.0±0.2, for 24 hours. The resulting leachate contained a nondetectable amount of barium, when analyzed with a minimum concentration resolution of 0.05 ppm, well below the allowable EPA limits of 100.0 mg/l maximum.

EXAMPLE III

A sample of the pulverized obsidian obtained from and analyzed in Example I, which contained 111 mg/l of barium (total, Table I), was reacted with a stoichiometric quantity of pulverized gypsum. The resulting reacted obsidian was tested using the EPA toxicity 24 hour acid elution test of Example II. The resulting leachate was found to contain 1.01 mg/l of barium, well below the EPA maximum limit of 100.0 mg/l.

EXAMPLE IV

A sample of the pulverized obsidian obtained from and analyzed in Example I, which contained 111 mg/l of barium (Table I), was reacted with a stoichiometric quantity of pulverized gypsum and an additional amount of water. The resulting reacted obsidian was tested using the EPA toxicity 24 hour acid elution test of Example II. The resulting leachate was found to contain 0.70 mg/l of barium, even further below the EPA maximum limit of 100.0 mg/l.

CONCLUSION

The use of a plasma arc torch to incinerate oil industry drilling mud waste, followed by additional detoxification of the emissions residue stream and obsidian residue, as disclosed by the present invention, results in an inert waste product that meets all EPA toxicity guidelines. The present invention has been described in relation to a preferred embodiment thereof and several alternatives thereto. One of ordinary skill, after reading the foregoing specification, will be able to effect various changes, substitutions of equivalents, and other alterations without departing from the broad concepts disclosed herein. It is therefore intended that the scope of Letters Patent granted hereon be limited only by the definition contained in the following claims and equivalents thereof.

The embodiments of the invention in which an exclusive property or privilege is claimed are defined as follows:

1. A method for detoxifying a semiliquid waste containing water, petroleum oil, earth, organic contaminants, and metal contaminants, said method comprising:
    separating said semiliquid waste into a substantially solid waste portion and a substantially liquid waste portion;
    feeding said solid waste portion and said liquid portion separately into a combustion chamber;
    combusting said waste in said combustion chamber by exposing said waste to a plasma arc torch to produce a substantially gaseous emission stream and a solid obsidian residue by continuously feeding said waste into said combustion chamber for combusting by said plasma arc torch, producing a continuous molten residue stream and cooling said molten residue stream to produce said solid obsidian residue;
    reducing the concentration of water-soluble metal contaminants in said solid residue to nontoxic levels;
    cleansing said gaseous emission stream to reduce the concentrations of contaminants therein to nontoxic levels, producing a cleansed exhaust gas and an emission residue; and
    removing trace metal contaminants from said emission residue.

2. The method of claim 1, further comprising shredding said solid waste portion into chips prior to feeding said solid waste into said combustion chamber.

3. The method of claim 2, wherein said separating of said semiliquid waste includes passing said semiliquid waste through a centrifuge.

4. The method of claim 1, wherein said waste is produced by oil industry drilling operations.

5. A method for detoxifying a semiliquid waste containing water and petroleum oil, earth, organic contaminants, and metal contaminants, said method comprising:
    continuously feeding said waste into a combustion chamber for combusting by a plasma arc torch, producing a continuous molten residue stream, and continuous substantially gaseous emission stream;
    cooling said molten residue stream to produce solid residue in the form of an obsidian residue;
    reducing the concentration of water-soluble toxic compounds in said obsidian residue to nontoxic levels except for barium and barium compounds;
    cleansing said gaseous emission stream to reduce the concentrations of contaminants therein to nontoxic levels, producing a cleansed exhaust gas and an emission residue; and
    removing trace metal contaminants from said emission residue.

6. The method of claim 5, wherein the concentration of water soluble barium in said obsidian residue is reduced by pulverizing said obsidian residue and contacting said pulverized obsidian residue with an electroplating solution, placing an anode and a cathode into said electroplating solution, and imposing a current across said anode and said cathode to cause the barium to plate onto said cathode.

7. The method of claim 6, wherein said electroplating solution contains sulfuric acid.

8. The method of claim 7, wherein said anode is formed of a metal selected from the group consisting of copper and stainless steel.

9. The method of claim 8, wherein said cathode is formed from lead.

10. The method of claim 5, wherein the concentration of water soluble barium in said obsidian residue is reduced by pulverizing said obsidian residue and adding water and hydrated calcium sulfate to said pulverized obsidian residue to produce water-insoluble barium sulfate.

11. A method for detoxifying a semiliquid waste, said waste containing water and petroleum oil, earth, organic contaminants, and metal contaminants, said method comprising:
    continuously feeding said waste into a combustion chamber;
    combusting said waste in said combustion chamber by exposing said waste to a plasma arc torch to produce a substantially gaseous emission stream and a continuous molten residue stream, said gaseous emission stream containing gaseous contaminants and solid particulates;
    cooling said molten residue stream to produce a solid obsidian residue;
    reducing the concentration of water-soluble metal contaminants in said solid residue to nontoxic levels;
    cleansing said gaseous emission stream to reduce the concentrations of contaminants therein to nontoxic levels, said cleansing of said gaseous emission stream including the steps of condensing water vapor in said gaseous emission stream, growing particulates in said gaseous emission stream, absorbing said gaseous contaminants and collecting said particulates in said condensed water vapor, and separating said condensed water vapor and particulates from said gaseous emission stream to produce an emission residue; and
    removing trace metal contaminants from said emission residue by contacting said emission residue with an electroplating solution, placing an anode and a cathode into said electroplating solution, and imposing a current across said anode and said cathode to cause said trace metal contaminants to plate onto said cathode.

12. The method of claim 11, wherein said electroplating solution contains sulfuric acid.

13. The method of claim 12, wherein said anode is formed of a metal alloy selected from the group consisting of copper and stainless steel.

14. The method of claim 13, wherein said cathode is formed from lead.

15. A system for detoxifying a semiliquid waste containing water and petroleum oil, earth, organic contaminants, and metal contaminants, said system comprising:

means for separating said semiliquid waste into a substantially solid waste portion and a substantially liquid waste portion;

a combustion chamber having an inlet for receiving said waste from said separating means;

feed means having an inlet from said separating means and an outlet to said combustion chamber for separately feeding said liquid waste portion and said solid waste portion into said combustion chamber;

a plasma arc torch mounted in fluid communication with said combustion chamber for combusting said waste to produce a substantially gaseous emission stream and an obsidian residue;

means associated with said outlet for receiving said solid obsidian residue and reducing the concentration of unbound metal contaminants in said solid residue to nontoxic levels;

means in communication with said combustion chamber for receiving said gaseous emission stream and for cleansing said gaseous emission stream to reduce the concentration of gaseous contaminants and solid particulates therein to nontoxic levels, producing a cleansed exhaust gas and an emission residue; and means for collecting said emission residue and for removing trace metal contaminants from said emission residue.

16. The system of claim 15, wherein said waste is produced by oil industry drilling operations.

17. The system of claim 15, further comprising means, connected to said inlet of said means for separately feeding said solid waste portion, for shredding said solid waste portion into chips.

18. The system of claim 15, wherein said means for reducing the concentration of unbound metal contaminants in said obsidian residue includes means to pulverize said obsidian residue, and further comprises an electroplating bath for receiving said pulverized obsidian residue, said bath including a plating solution, an anode and a cathode.

19. The system of claim 15, wherein said means for reducing the concentration of unbound metal contaminants in said obsidian residue includes means to pulverize said obsidian residue, and further comprises means for collecting said pulverized obsidian residue and contacting said pulverized obsidian residue with water and hydrated calcium sulfate to produce water-insoluble barium sulfate.

* * * * *